United States Patent
Xiang et al.

(10) Patent No.: US 11,237,135 B2
(45) Date of Patent: Feb. 1, 2022

(54) SELF-POWERED ACOUSTIC SENSOR SYSTEM

(71) Applicant: X-wave Innovations, Inc., Gaithersburg, MD (US)

(72) Inventors: Dan Xiang, Gaithersburg, MD (US); Uday Singh, Gaithersburg, MD (US)

(73) Assignee: X-Wave Innovations, Inc., Gaithersburg, MD (US)

( * ) Notice: Subject to any disclaimer, the term of this patent is extended or adjusted under 35 U.S.C. 154(b) by 151 days.

(21) Appl. No.: 16/528,577

(22) Filed: Jul. 31, 2019

(65) Prior Publication Data
US 2020/0141909 A1 May 7, 2020

Related U.S. Application Data

(60) Provisional application No. 62/766,750, filed on Nov. 5, 2018.

(51) Int. Cl.
  *G01N 29/24* (2006.01)
  *G01N 29/036* (2006.01)
  *G01N 29/14* (2006.01)

(52) U.S. Cl.
  CPC ....... *G01N 29/2431* (2013.01); *G01N 29/036* (2013.01); *G01N 29/14* (2013.01); *G01N 2291/0426* (2013.01)

(58) Field of Classification Search
  CPC .. G01N 29/2431; G01N 29/036; G01N 29/14; G01N 29/343; G01N 29/07;
  (Continued)

(56) References Cited

U.S. PATENT DOCUMENTS 4,483,630 A   11/1984  Varela
5,022,014 A   6/1991   Kulczyk
(Continued)

FOREIGN PATENT DOCUMENTS

WO   2004090484 A3   6/2005
WO   2016/162880 A1  10/2016

OTHER PUBLICATIONS

R Nishanth, K Lingadurai, S Periyannan and K Balasubramaniam, "Ultrasonic waveguide-based distributed temperature measurement on a solid surface", Insight • vol. 59 • No. 7 • Jul. 2017.
(Continued)

*Primary Examiner* — Suman K Nath
(74) *Attorney, Agent, or Firm* — Sheets Law PLLC; Kendal M. Sheets

(57) ABSTRACT

An acoustic sensor for sensing environmental attributes within an enclosure is disclosed. The acoustic sensor may include a bulk acoustic wave (BAW) transducer configured to be installed outside the enclosure. The BAW transducer may generate an acoustic wave pulse and receive a reflected acoustic wave pulse. The acoustic sensor may further a waveguide assembly configured to be installed inside the enclosure. The waveguide assembly configured to receive the acoustic wave pulse from the BAW transducer. The acoustic sensor may further include a sensing device, wherein the sensing device may determine a change in one or more acoustic wave propagation parameters, based on the generated acoustic wave pulse and the reflected acoustic wave pulse. The sensing device may further determine one or more environmental attributes within the enclosure, based on the change in the one or more acoustic wave propagation parameters.

16 Claims, 6 Drawing Sheets

(58) Field of Classification Search
CPC .............. G01N 29/11; G01N 29/245; G01N 2291/0426; G01N 2291/02845; G01N 2291/02881; G01N 2291/02872
See application file for complete search history.

(56) References Cited

U.S. PATENT DOCUMENTS

| | | | | |
|---|---|---|---|---|
| 5,305,412 A * | 4/1994 | Paoli | ............... | G02B 6/12004 372/50.1 |
| 5,400,788 A * | 3/1995 | Dias | ............... | A61B 8/0833 600/459 |
| 6,880,402 B1 * | 4/2005 | Couet | ............... | E21B 47/085 73/579 |
| 7,804,598 B2 * | 9/2010 | Hall | ............... | B08B 17/02 356/445 |
| 2013/0121373 A1 | 5/2013 | Skliar | | |
| 2015/0096942 A1 | 4/2015 | Wang | | |
| 2016/0153938 A1 | 6/2016 | Balasubramaniam | | |
| 2018/0202853 A1 * | 7/2018 | Bostrom | ............... | B60K 15/03 |

OTHER PUBLICATIONS

S. Periyannan, P. Rajagopal and K. Balasubramaniam, "Robust Ultrasonic Waveguide based Distributed Temperature Sensing," Physics Procedia, vol. 70, p. 514, 2015.

Suresh Periyannan, and Krishnan Balasubramaniam, "Distributed temperature sensing using a SPIRAL configuration ultrasonic waveguide", AIP Conference Proceedings 1806, 030016 (2017).

Yue Wang, Fangxin Zou?, Frederic B. Cegla, "Acoustic waveguides: An attractive alternative for accurate androbust contact thermometry", Sensors and Actuators A 270 (2018) 84.

Riichi Murayama, Masayuki Kobayashi, Kenshi Matsumoto, Makiko Kobayashi, "Ultrasonic Inspection System Using a Long Waveguide with an Acoustic Horn for High-Temperature Structure", Journal of Sensor Technology, 2014, 4, 177.

Hai-Dang Tam Nguyen, Dung-An Wang, "Design of an Ultrasonic Steel Horn With a Bézier Profile", International Conference on Green Technology and Sustainable Development Sep. 29-30, 2012, Hochiminh City, Vietnam.

* cited by examiner

SELF-POWERED ACOUSTIC SENSOR SYSTEM

CROSS-REFERENCE TO RELATED APPLICATIONS

This application claims priority benefits under 35 U.S.C. § 119(e) to U.S. Provisional Application No. 62/766,750 filed Nov. 5, 2018, which is hereby incorporated by reference in its entirety.

FIELD OF INVENTION

This disclosure relates generally to sensors for measuring environmental attributes, including but not limited to, temperature, pressure and relative humidity, and more particularly to an application of an acoustic sensor system for monitoring environmental conditions and/or detecting changes, including temperature and pressure, in an enclosed environment with no direct accessibility via either electrical, optical or electromagnetic connection(s).

BACKGROUND

Many applications may require monitoring environmental attributes, such as temperature, pressure, and humidity within an enclosure. In some cases, in these enclosures, there may be no direct access via either electrical, optical or electromagnetic connection. For example, the enclosure may be a reaction chamber, a pressure vessel, etc. In such enclosures, monitoring the environmental attributes may be essential for achieving desired results. However, due to no direct access inside these enclosures, it may not be possible to monitor the environmental attributes.

There exist some systems of monitoring the environmental attributes. However, these systems require either wired, optical or electromagnetic connections to a sensor installed inside the enclosure. As a result, these systems are not operable when the sensor installed inside the enclosure is isolated by a medium of the enclosure (for example, a wall) through which the electromagnetic or optical access is not possible. As a result, sensing and monitoring environmental attributes within the enclosure is difficult to achieve, if a wired, or an optical or an electromagnetic connection to provide power and signal transitioning to the sensor installed in the enclosure is prohibited or not possible.

SUMMARY

A self-powered acoustic sensor system is disclosed. The acoustic sensor involves an acoustic waveguide assembly, which includes an acoustic waveguide with an acoustic horn, and an acoustic transducer. The acoustic horn is mounted on an inner surface of an enclosure wall. This acoustic waveguide assembly allows detection of environmental attributes such as temperature, pressure, relative humidity inside the enclosures by using the acoustic wave signals both transmitted and received from outside of the enclosure.

As appreciated by those skilled in the art, acoustic, or ultrasonic wave is one of the most commonly-used signals for nondestructive testing and structural health monitoring, because it is easy to be generated and measured at low cost. The acoustic wave can propagate though a structure over long distances. When an acoustic transducer mounted on a structure transmits acoustic signals, this transducer or another acoustic transducer mounted on the same structure may receive the signals, if they are strong enough. The propagation of acoustic wave though the material/structure is affected by external parameters, which include damage or defect, temperature, and stress that affect the path of the acoustic wave propagation. The changes resulting from these parameters may include amplitude change, phase shift or other. Analyzing these changes in the received signals, can be correlated to the environment attributes reading after calibration.

In one embodiment, a sensing device for sensing environmental attributes within an enclosure is disclosed. The sensing device includes a processor, and a memory communicatively coupled to the processor. The memory stores processor instructions, which, on execution, may cause the processor to excite a bulk acoustic wave (BAW) transducer configured to be installed outside the enclosure to generate an acoustic wave pulse. The generated acoustic wave pulse may be received by a waveguide assembly configured to be installed inside the enclosure. The BAW transducer may be further configured to receive a reflected acoustic wave pulse from the waveguide assembly. The processor instructions, on execution, may further cause the processor to determine a change in one or more acoustic wave propagation parameters, based on the generated acoustic wave pulse and the reflected acoustic wave pulse. The processor instructions, on execution, may further cause the processor to determine one or more environmental attributes within the enclosure, based on the change in the one or more acoustic wave propagation parameters.

In another embodiment, an acoustic sensor for sensing environmental attributes within an enclosure is disclosed. The acoustic sensor may include a bulk acoustic wave (BAW) transducer configured to be installed outside the enclosure. The BAW transducer may be configured to generate an acoustic wave pulse and receive a reflected acoustic wave pulse. The acoustic sensor may further include a waveguide assembly configured to be installed inside the enclosure. The waveguide assembly may include an acoustic horn configured to receive the acoustic wave pulse generated by the BAW transducer, and a waveguide coupled to the acoustic horn, wherein the waveguide may be configured to receive the acoustic wave pulse from the acoustic horn, and wherein at least one physical property of the waveguide may be sensitive to the environmental attributes within an enclosure. The acoustic sensor may further include a sensing device. The sensing device may determine a change in one or more acoustic wave propagation parameters, based on the generated acoustic wave pulse and the reflected acoustic wave pulse. The sensing device may further determine one or more environmental attributes within the enclosure, based on the change in the one or more acoustic wave propagation parameters.

In yet another embodiment, a method of sensing environmental attributes within an enclosure is disclosed. The method may include generating, by a bulk acoustic wave (BAW) transducer, an acoustic wave pulse, wherein the BAW transducer may be installed outside the enclosure, and wherein the generated acoustic wave pulse may be received by a waveguide assembly installed inside the enclosure. The method may further include receiving, by the BAW transducer, a reflected acoustic wave pulse from the waveguide assembly. The method may further include receiving, by a sensing device, a generated electric pulse corresponding to the generated acoustic wave pulse and a reflected electric pulse corresponding to the reflected acoustic wave pulse from the BAW transducer. The method may further include comparing, by a sensing device, the generated electric pulse and the reflected electric pulse. The method may further include determining, by the sensing device, a change in one or more acoustic wave propagation parameters based on the comparison. The method may further include determining, by the sensing device, one or more environmental attributes within the enclosure, based on the change in the one or more acoustic wave propagation parameters.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF THE DRAWINGS

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

The present embodiment is to be considered as an exemplification of the invention, and is not intended to limit the invention to the specific embodiments illustrated by the figures or description below.

Figure 1:
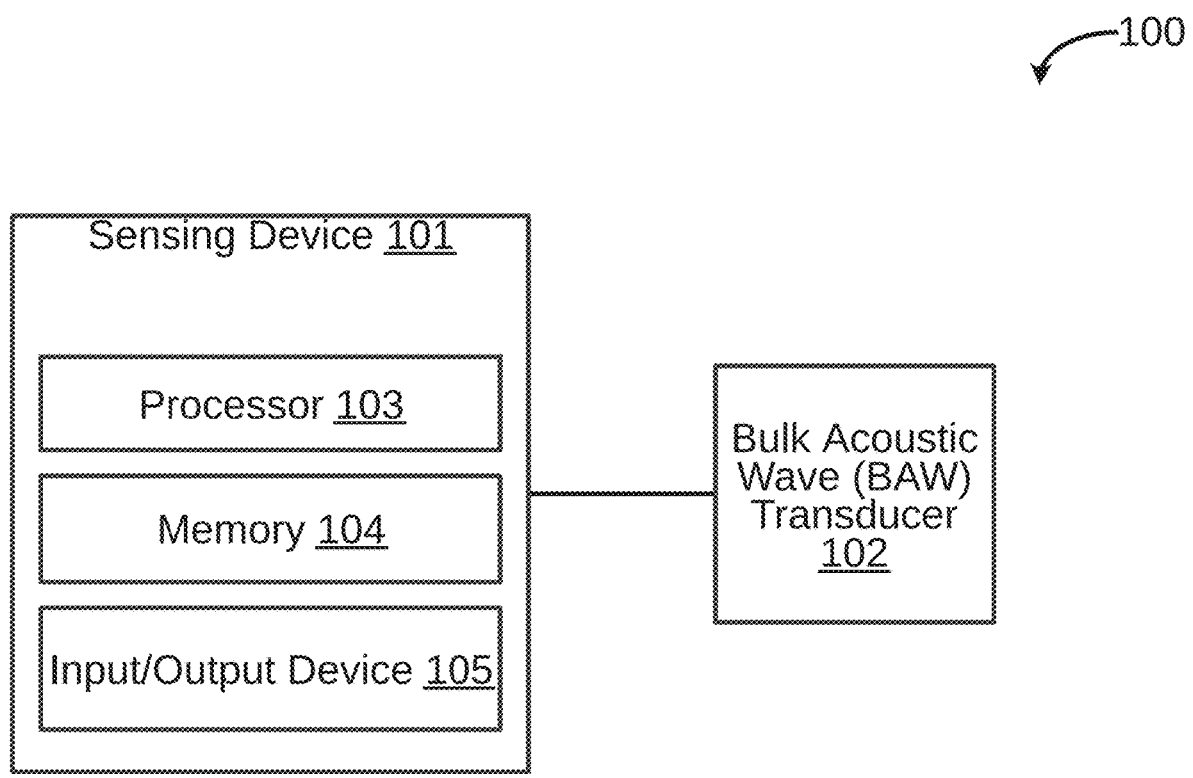
FIG. 1 is a functional block diagram of an acoustic sensor for sensing environmental attributes within an enclosure, in accordance with an embodiment.

Referring now to FIG. 1, an acoustic sensor 100 for sensing environmental attributes within an enclosure is illustrated, in accordance with an embodiment. The acoustic sensor 100 includes a sensing device 101, and a bulk acoustic wave (BAW) transducer 102. The acoustic sensor 100 may further include a waveguide assembly (not shown in FIG. 1). It may be noted that the waveguide assembly may be installed inside the enclosure, and the BAW transducer may be installed outside the enclosure.

As will be described in greater detail in conjunction with FIG. 2 to FIG. 6, in order to sense environmental attributes within an enclosure, the sensing device 101 may trigger the BAW transducer installed outside the enclosure to generate an acoustic wave pulse. The generated acoustic wave pulse may be received by the waveguide assembly installed inside the enclosure. The BAW transducer may receive a reflected acoustic wave pulse from the waveguide assembly. The sensing device 101 may further determine a change in one or more acoustic wave propagation parameters, upon comparison of the generated acoustic wave pulse and the reflected acoustic wave pulse. The sensing device 101 may further determine one or more environmental attributes within the enclosure, based on the change in the one or more acoustic wave propagation parameters.

In order to perform the above discussed functionalities, the sensing device 101 may include a processor 103 and a memory 104. The memory 104 may store instructions that, when executed by the processor 103, cause the processor 103 to sense environmental attributes within an enclosure, as discussed in greater detail in FIG. 2 to FIG. 6. The memory 104 may be a non-volatile memory or a volatile memory. Examples of non-volatile memory, may include, but are not limited to a flash memory, a Read Only Memory (ROM), a Programmable ROM (PROM), Erasable PROM (EPROM), and Electrically EPROM (EEPROM) memory. Examples of volatile memory may include, but are not limited to Dynamic Random Access Memory (DRAM), and Static Random-Access memory (SRAM). The memory 104 may also store various data (e.g., acoustic wave propagation parameter data, environmental attributes data, generated acoustic wave pulse data, reflected acoustic wave pulse data, etc.) that may be captured, processed, and/or required by the acoustic sensor 100. The sensing device 101 may further include one or more input/output device 105 through which the sensing device 101 may interact with a user and vice versa. By way of an example, the input/output device 105 may be used to render a the sensed parameters to a user via a display screen.

Figure 2:
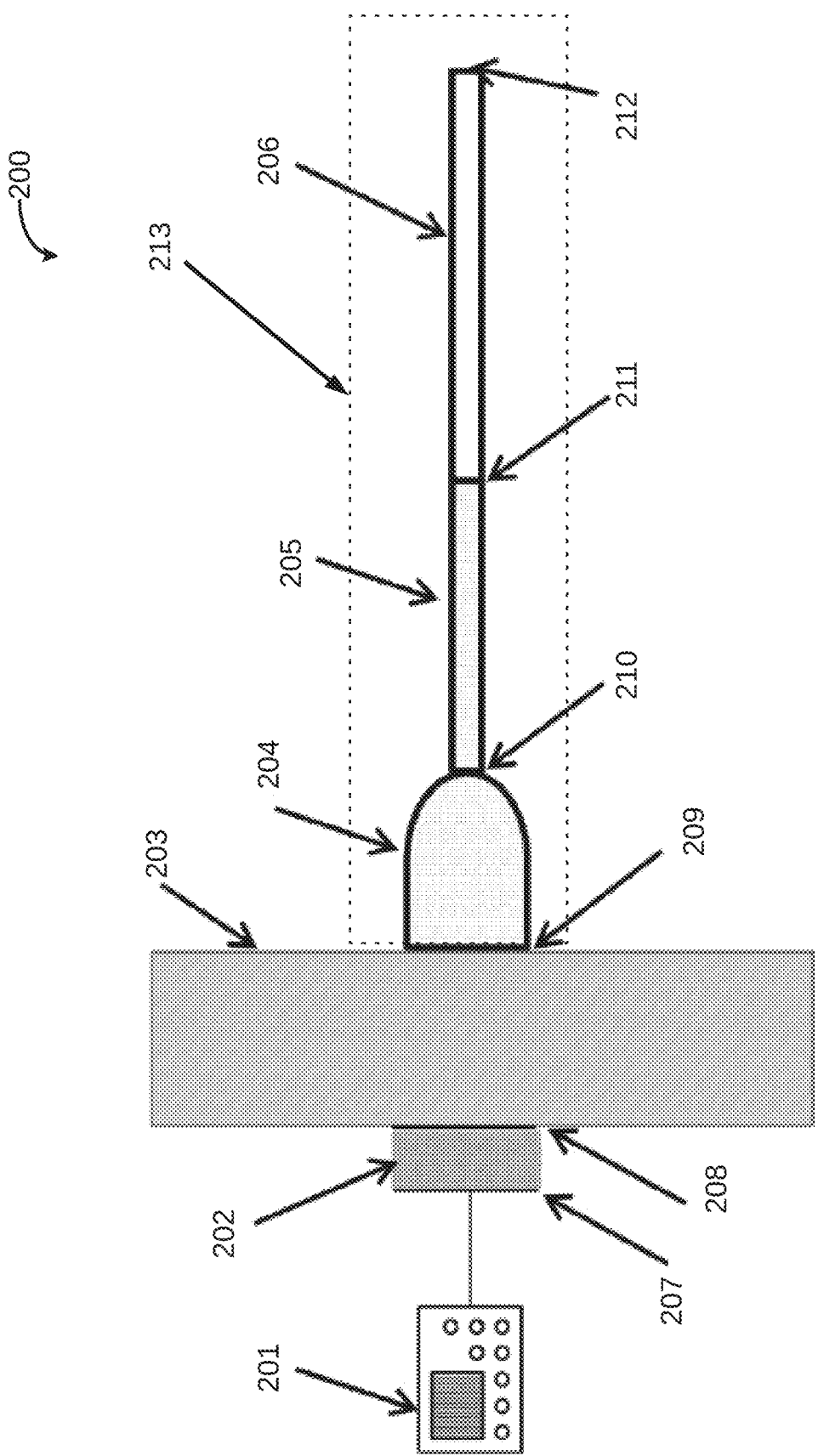
FIG. 2 illustrates an acoustic sensor for sensing environmental attributes within an enclosure, in accordance with an embodiment.

Referring now to FIG. 2, an acoustic sensor 200 (analogous to the acoustic sensor 100) is illustrated, in accordance with an embodiment. The acoustic sensor 200 includes a BAW transducer 202, a waveguide assembly 213, and a sensing device 201. The BAW transducer 202 may be configured to be installed outside the enclosure. By way of an example, the BAW transducer 202 may be installed on an outer surface of a wall 203 of the enclosure. In some embodiments, the BAW transducer 202 may be configured to generate an acoustic wave pulse and receive a reflected acoustic wave pulse. The waveguide assembly 213 be configured to be installed inside the enclosure.

In some embodiments, BAW transducer 202 may be made of a piezoelectric element. By way of an example, the piezoelectric element may include a lead Zirconate Titanate (PZT), Lithium Niobate, Lithium Tantalate, Quartz, or Aluminum Nitride. In some embodiments, BAW transducer 202 may have its first surface 207 and second surface 208 covered with a thin layer of conducting material. This thin layer of conducting material may be obtained by one of metal deposition or polishing with a conducting paint. It may be noted that the BAW transducer 202 may exploit the piezoelectric element property to convert electric pulses in to acoustic wave pulses, and vice versa using the piezoelectric effect. The surface 208 may be in mechanical and electrical contact with the outer surface of the wall 203 of the enclosure. It may be understood that this outer surface of the wall 203 may provide the a ground for the signal. The BAW transducer 202 may be communicatively coupled to the sensing device 201. By way of an example, the first surface 207 of the BAW transducer 202 may be communicatively coupled to the sensing device 201. During operation, the BAW transducer 202 may generate an acoustic wave pulse which may propagate through the wall 203 and reach an inner surface of the wall 203, to be then received by the waveguide assembly 213.

The waveguide assembly 213 may be installed on the inner surface of the wall 203 via a first interface 209. The waveguide assembly 213 may include an acoustic horn 204 and a waveguide. In some embodiments, the waveguide may include a solid waveguide portion 205 and a hollow waveguide portion 206. In alternate embodiments, the waveguide may include either only the solid waveguide portion 205, or only the hollow waveguide portion 206. In some embodiments, both the acoustic horn 204 and the waveguide (the solid waveguide portion 205 and the hollow waveguide portion 206) have a circular cross-section. Further, the diameter of the cross-section of the acoustic horn 204 is greater than the diameter of the cross-section of the waveguide.

The acoustic horn 204 may be installed on the inner surface of the wall 203. The acoustic wave pulse may reach the acoustic horn via the first interface 209. It may be noted that owing to the larger diameter, the acoustic horn 204 may enable efficient transfer of the acoustic wave pulse to the waveguide. In some embodiments, the acoustic horn 204 and the waveguide (including the solid waveguide portion 205 and the hollow waveguide portion 206) are made of the same material as the wall 203. A proximal end of waveguide may be connected to acoustic horn 204 via a second interface 210. In the embodiments using both the solid waveguide portion 205 and the hollow waveguide portion 206, the solid waveguide portion 205 may be connected to the hollow waveguide portion 206 via a third interface 211. In some embodiments, for pressure sensing application, a distal end 212 of the waveguide may be hermetically sealed.

During operation, the acoustic wave pulse may be reflected from the second interface 210, the third interface 211 and the distal end 212. These reflected acoustic wave pulses may propagate back toward the acoustic horn 204, and then from the acoustic horn 204 towards the first interface 209. The reflected acoustic wave pulse may enter the first interface 209, and then propagate through the wall 203, and reach the BAW transducer 202.

In some embodiments, the BAW transducer 202 upon receiving the reflected acoustic wave pulse, may convert the reflected acoustic wave pulse into an electrical pulse. This electric pulse may then be received by the sensing device 201. The sensing device 201 may be installed outside the enclosure. The sensing device 201 may determine a change in one or more acoustic wave propagation parameters, upon comparison of the generated acoustic wave pulse and the reflected acoustic wave pulse. The sensing device 201 may further determine one or more environmental attributes within the enclosure, based on the change in the one or more acoustic wave propagation parameters. It may be noted that the environmental attributes may include comprise temperature, pressure, and relative humidity.

It may be noted that the sensing mechanism of the sensing device 201 may be based on waveguide physical property. It may be further noted that at least one physical property of the waveguide is sensitive to the environmental attributes within an enclosure. For example, a change in the temperature may affect (change) the waveguide propagation speed inside the waveguide. This may, in turn, affect the time of flight of the acoustic wave pulse (i.e. time taken between transmission acoustic wave pulse from the BAW transducer 202 and reception of the acoustic wave pulse at the BAW transducer 202).

The sensing device 201 may correlate the time of flight of the acoustic wave pulse and a pressure reading upon calibration. It may be noted that a change in pressure may generate radial stress in the waveguide, which may lead to a change in the acoustic wave propagation characteristics. By way of an example, the acoustic wave propagation characteristics may include amplitude and time delay. The changes in wave propagation characteristics may then be correlated to the pressure reading after calibration.

Figure 3:
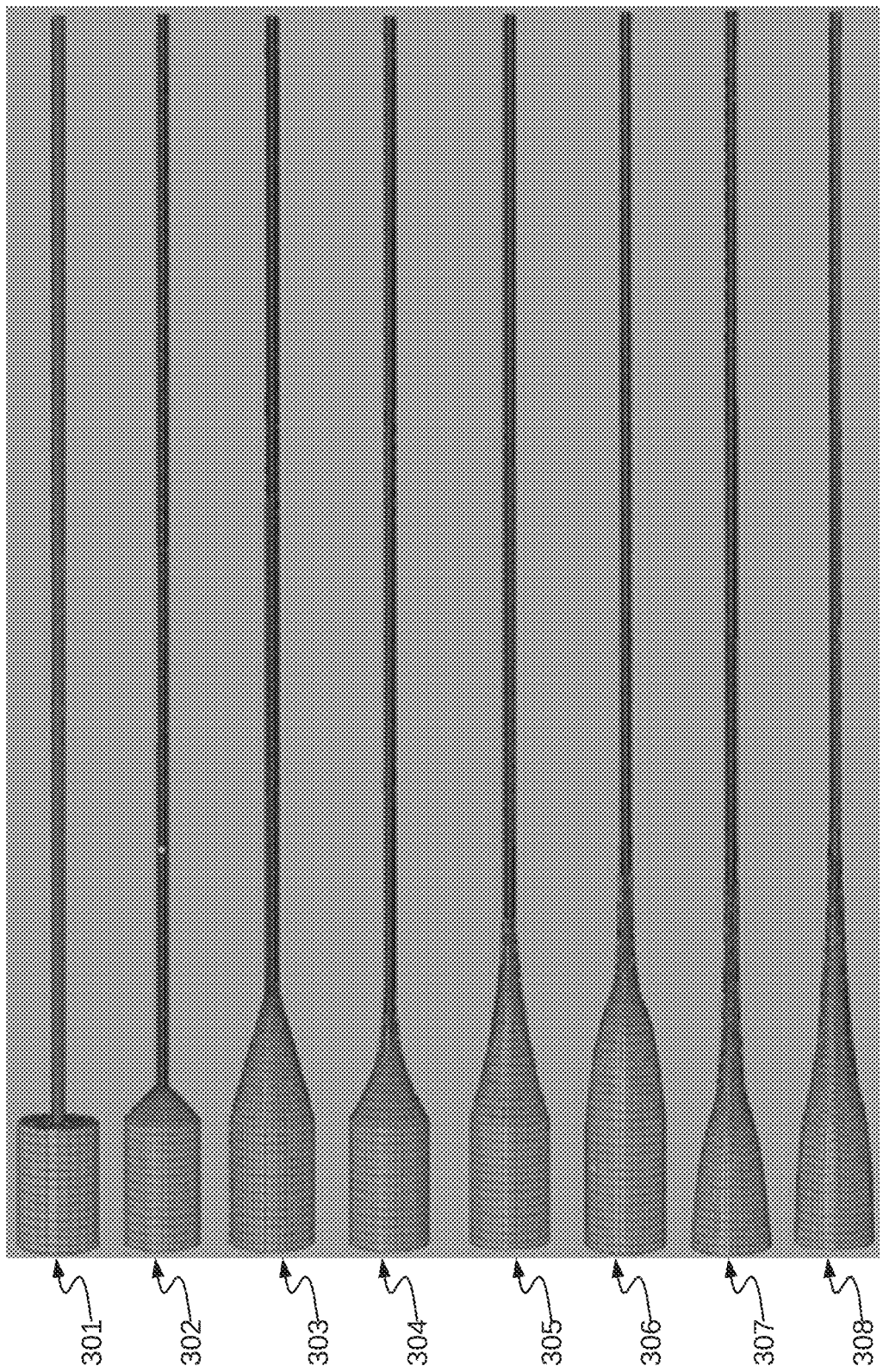
FIG. 3 illustrates various embodiments of an acoustic horn.

Referring now to FIG. 3, various embodiments 302-308 of the acoustic horn 300 (analogous to the acoustic horn 204), are illustrated. By way of an example, the acoustic horn 300 for using with a cylindrical waveguide (i.e. having a circular cross-section) may be a step acoustic horn 301, a cone acoustic horn 302 having 45 degree angle, a cone acoustic horn 303 having 15 degree angle, a B-spline acoustic horn 304, another B-spline acoustic horn 305, a Béizer acoustic horn 306, another Béizer acoustic horn 307, and a yet another Béizer acoustic horn 308.

Figure 4:
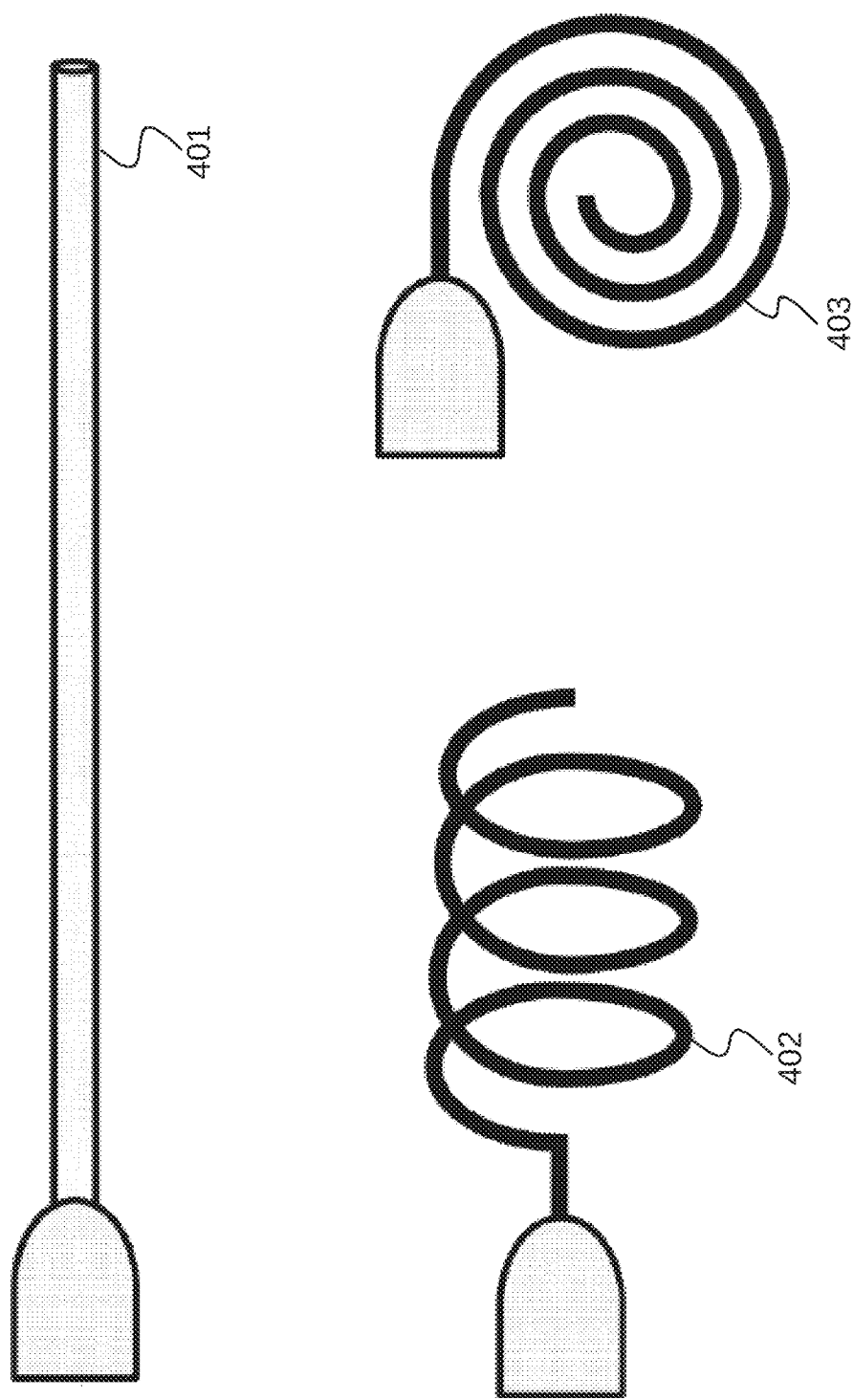
FIG. 4 illustrates various embodiments of a cylindrical waveguide.

Referring now to FIG. 4, various embodiments 401-403, of a cylindrical waveguide 400 are illustrated. By way of an example, a waveguide 401 may have a shape of a long rod or tube. It may be noted that the geometry of the waveguide may be determined by based on an ultrasonic guided wave frequency and waveguide material. In another embodiment, a waveguide 402 may have a bent shape or a spring shape. This bent shape or spring shape may allow reducing the total length of the rod/tube of the cylindrical waveguide. In yet another embodiment, a cylindrical waveguide 403 may have spiral shape, based on the application requirement. It may be noted that both the rod and tube may be capable of detecting temperature change.

In some embodiments, in order to detect pressure, a tube waveguide having a cap may be used. In some embodiments, in order to sense/detect gas, outer surface of at least a portion of the waveguide may be coated with a gas sensitive layers. For example, a layer of TiO2 may be provided for humidity sensing.

Figure 5:
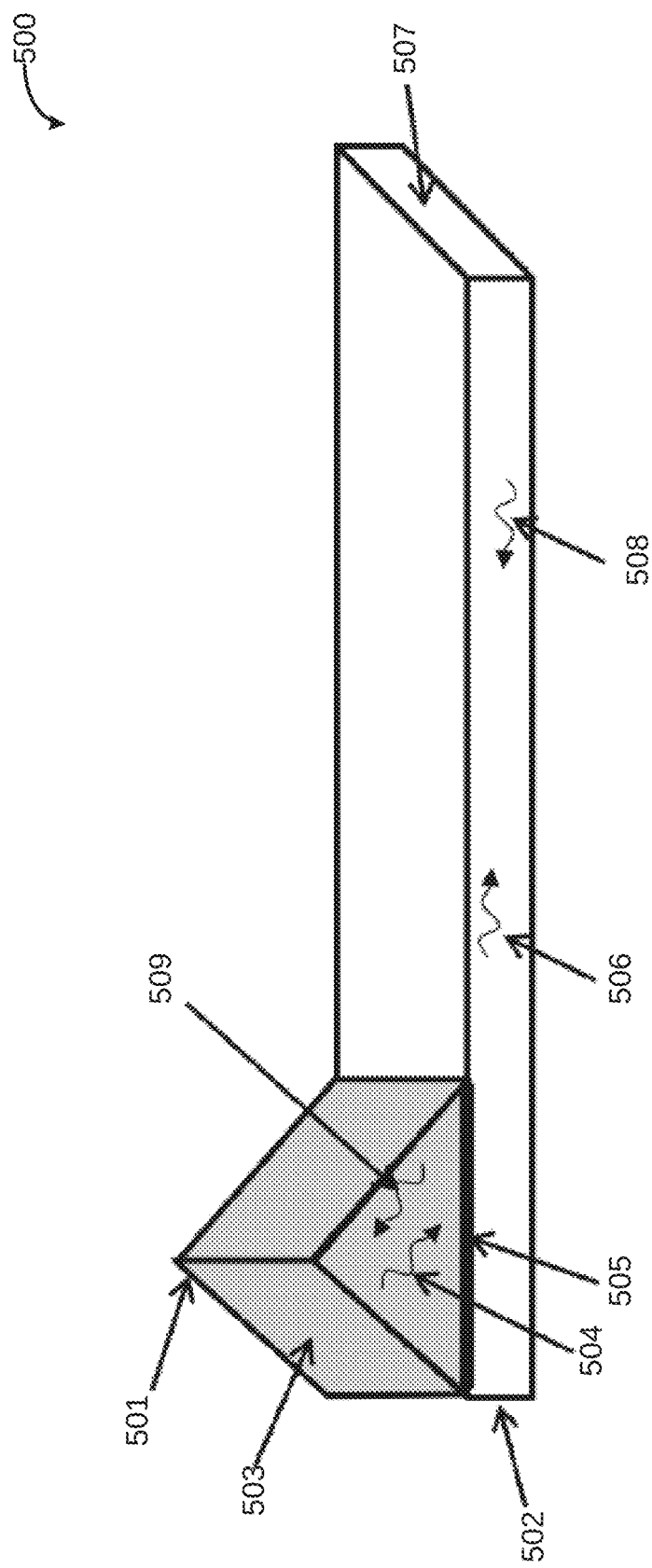
FIG. 5 illustrates a waveguide assembly, in accordance with an embodiment.

Referring now to FIG. 5, a waveguide assembly 500, is illustrated in accordance with an embodiment. The waveguide assembly 500 may include a wedge acoustic horn 501 and thin plate waveguide 502. The thin plate waveguide 502 may be coupled to the wedge acoustic horn 501, to receive an acoustic wave form the wedge acoustic horn 501. The acoustic wave pulse may enter a surface 503 of the wedge acoustic horn 501. The acoustic wave pulse may be propagated along a path 504 through the wedge acoustic horn 501 towards the thin plate waveguide 502. The wedge acoustic horn 501 may be coupled to the thin plate waveguide 502 via an interface 505. At the interface 505, a mode conversion may take place, which may launch both symmetric and antisymmetric wave modes in the thin plate waveguide 502. It may be noted that an amplitude ratio of the symmetric mode and the antisymmetric mode may depend on the wedge angle (of the wedge acoustic horn 501). Both the symmetric mode and the antisymmetric mode may propagate along a path 506 through the thin plate waveguide 502 towards the waveguide end 507. The acoustic wave reflected from the waveguide end 507 may propagate back along a path 508 though the thin plate waveguide 502, and may reach the interface 505. At the interface 505, the reflected acoustic wave may undergo mode conversion while entering the wedge acoustic horn 501. The reflected acoustic wave propagating along a path 509 through the wedge acoustic horn 501 may reach the surface 503.

Figure 6:
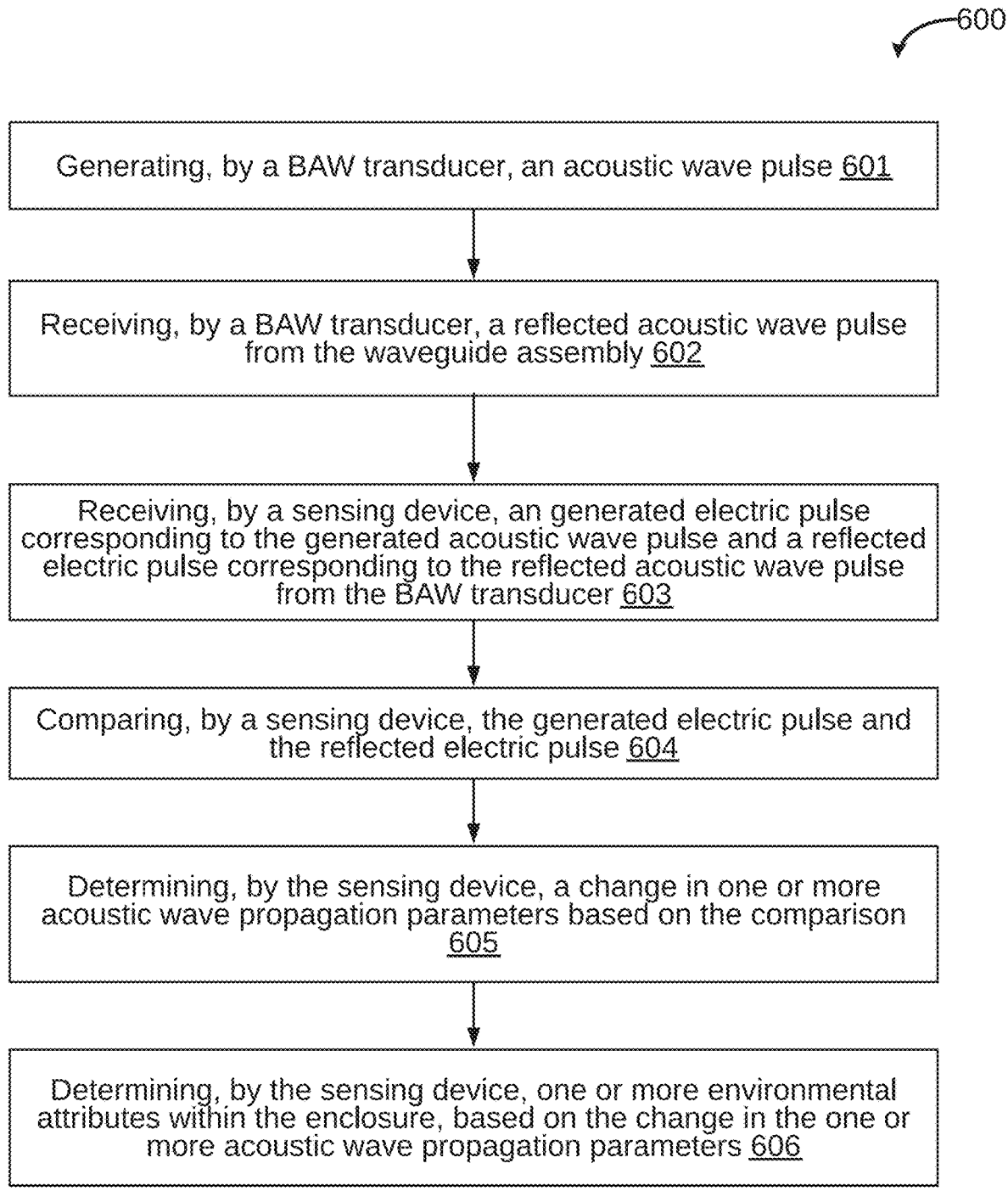
FIG. 6 is a flowchart of a method of sensing environmental attributes within an enclosure is illustrated, in accordance with an embodiment.

Referring now to FIG. 6, a flowchart 600 of a method of sensing environmental attributes within an enclosure is illustrated, in accordance with an embodiment. At step 601, an acoustic wave pulse may be generated by a bulk acoustic wave (BAW) transducer. The BAW transducer may be installed outside the enclosure. The generated acoustic wave pulse may be received by a waveguide assembly installed inside the enclosure. At step 602, a reflected acoustic wave pulse may be received by the BAW transducer from the waveguide assembly. At step 603, a generated electric pulse corresponding to the generated acoustic wave pulse and a reflected electric pulse corresponding to the reflected acoustic wave may be received by a sensing device from the BAW transducer. At step 604, the generated electric pulse and the reflected electric pulse may be compared by the sensing device. At step 605, a change in one or more acoustic wave propagation parameters may be determined based on the comparison. At step 606, one or more environmental attributes within the enclosure may be determined by the sensing device, based on the change in the one or more acoustic wave propagation parameters. The environmental attributes may include temperature, pressure, and relative humidity. The one or more acoustic wave propagation parameters may include time of flight of the acoustic wave pulse and amplitude of the acoustic wave pulse.

As will be also appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

The present invention discloses an acoustic sensor and techniques for measuring of environment attributes such as temperature, pressure, and humidity without any direct access available to a sensor either via either wire, optical or electromagnetic connections. The acoustic sensor can be fabricated with same material used to make enclosure. This avoids the potential contamination of material(s) inside the enclosure from the sensor material used in conventional sensor itself.

The present invention is based on ultrasonic waveguide. The ultrasonic wave is generated at the outside wall of the enclosure using an ultrasonic transducer. The waves propagate though the enclosure wall and reach acoustic waveguide sensor assembly, and get reflected at the junction(s) and end of the waveguide. The reflected wave is received by the ultrasonic transducer. The change in temperature, pressure, or gas species changes the wave propagation characteristic and these changes can be determined from the reflected wave signal. By analyzing all the received signals, a reading of the environmental parameter can be recorded to indicate the condition in the structure.

The present techniques eliminate need of either wired, optical or electromagnetic connections to the sensor and presence of no foreign material inside the enclosure. Further, the present techniques are low cost, accurate, maintenance free, offer high sensitivity and accuracy, and offers easy to use solution for long-term monitoring for internal conditions such as, but not limited to, nuclear fuel storage casks, chemical pipes, etc.

It is intended that the disclosure and examples be considered as exemplary only, with a true scope and spirit of disclosed embodiments being indicated by the following claims.

What is claimed is:

1. A sensing device for sensing environmental attributes within an enclosure, the sensing device comprising:
a processor; and
a memory communicatively coupled to the processor, wherein the memory stores processor instructions, which, on execution, causes the processor to:
trigger a bulk acoustic wave (BAW) transducer configured to be installed on an outer surface of the enclosure to generate an ultrasonic wave pulse, wherein the generated ultrasonic wave pulse is received by structured portions of a waveguide assembly configured to be installed isolated from the BAW transducer on an inner surface of the enclosure, the waveguide assembly comprising:
a solid acoustic horn, configured to be installed on the inner surface of the enclosure at a first interface, and configured to receive the ultrasonic wave pulse generated by the BAW transducer; and
a first waveguide portion coupled at second interface to the acoustic horn, wherein the first waveguide portion is coupled at a third interface to a first end of a second waveguide portion, wherein second end of the second waveguide portion is adapted as a distal end of the waveguide assembly, and wherein the ultrasonic wave pulse is reflected through structural portions from the second interface, the third interface, and the distal end through back through the first interface, through the inner and outer surfaces of the enclosure, and to the BAW transducer;

determine a change in one or more ultrasonic wave propagation parameters, based on the generated ultrasonic wave pulse and the reflected ultrasonic wave pulse; and determine one or more environmental attributes within the enclosure, based on the change in the one or more acoustic wave propagation parameters.

2. An acoustic sensor for sensing environmental attributes within an enclosure, the acoustic sensor comprising:

a bulk acoustic wave (BAW) transducer configured to be installed outside the enclosure coupled to an outside wall of the enclosure, wherein the BAW transducer is further configured to generate an ultrasonic wave pulse and receive a reflected ultrasonic wave pulse;

a waveguide assembly configured to be installed inside the enclosure, the waveguide assembly comprising:

an acoustic horn, configured to be coupled at an enlarged end to an inside wall of the enclosure at a first interface of the waveguide assembly, and configured to receive the ultrasonic wave pulse generated by the BAW transducer; and a waveguide coupled to a reduced end of the acoustic horn at second interface of the waveguide assembly, wherein the waveguide includes a first waveguide portion coupled at a third interface to a second waveguide portion, wherein an uncoupled end of the second waveguide portion is adapted as a distal end of the waveguide, wherein the waveguide is configured to receive the ultrasonic wave pulse that is propagated from the BAW transducer through enclosure wall to the acoustic horn, and from the acoustic horn through solid portions of the waveguide;

wherein the ultrasonic wave pulse is reflected from the second interface, the third interface, and the distal end, through the first interface and the enclosure wall to the BAW transducer, and wherein at least one physical property of the waveguide is sensitive to the environmental attributes within an enclosure.

3. The acoustic sensor of claim 2, wherein the acoustic horn is formed of solid or hollow metal and has a larger cross-section than the cross-section of the waveguide.

4. The acoustic sensor of claim 2, wherein the BAW transducer comprises either a piezoelectric element, or an electromagnetic ultrasonic transducer (EMAT), or a capacitive ultrasonic transducer, or a laser ultrasound generator and receive, or any other BAW generating method.

5. The acoustic sensor of claim 4, wherein the piezoelectric element may be formed of a piezoelectric material, selected from a lead Zirconate Titanate (PZT), Lithium Niobate, Lithium Tantalate, Quartz, or Aluminum Nitride.

6. The acoustic sensor of claim 2, wherein the BAW transducer comprises a thin layer of conducting material on at least one surface of the BAW transducer.

7. The acoustic sensor of claim 6, wherein the thin layer of the conducting material is obtained by one of metal deposition or polishing with a conducting paint.

8. The acoustic sensor of claim 2, wherein a the BAW transducer is configured to be either in mechanical or electrical contact or non-contact with an outer surface of a wall of the enclosure.

9. The acoustic sensor of claim 2, wherein a distal end of the waveguide is hermetically sealed.

10. The acoustic sensor of claim 2, wherein the environmental attributes to be measured include temperature, pressure, relative humidity, and gas species.

11. The acoustic sensor of claim 2, wherein the one or more acoustic wave propagation parameters including time of flight of the acoustic wave pulse and amplitude of the wave pulse in the waveguide structure are measured.

12. A method of sensing environmental attributes within an enclosure, the method comprising:

generating, by a bulk acoustic wave (BAW) transducer, an ultrasonic wave pulse, wherein the BAW transducer is installed on an outer surface of the enclosure, wherein the generated ultrasonic wave pulse is received by structured portions of a waveguide assembly installed isolated from the BAW transducer on an inner surface of the enclosure;

providing a solid acoustic horn, configured to be installed on the inner surface of the enclosure at a first interface, and configured to receive the ultrasonic wave pulse generated by the BAW transducer; and providing a first waveguide portion coupled at second interface to the acoustic horn, wherein the first waveguide portion is coupled at a third interface to a first end of a second waveguide portion, wherein second end of the second waveguide portion is adapted as a distal end of the waveguide assembly, and reflecting the ultrasonic wave pulse through structural portions from the second interface, the third interface, and the distal end through back through the first interface, through the inner and outer surfaces of the enclosure, and to the BAW transducer;

receiving, by the BAW transducer, the reflected ultrasonic wave pulse from the waveguide assembly;

receiving, by a sensing device, a generated electric pulse corresponding to the generated ultrasonic wave pulse and a reflected electric pulse corresponding to the reflected ultrasonic wave pulse from the BAW transducer;

comparing, by the sensing device, the generated electric pulse and the reflected electric pulse;

determining, by the sensing device, a change in one or more wave propagation parameters based on the comparison; and determining, by the sensing device, one or more environmental attributes within the enclosure, based on the change in the one or more acoustic wave propagation parameters.

13. The method of claim 12, wherein the environmental attributes comprise temperature, pressure, and relative humidity.

14. The method of claim 12, wherein the one or more acoustic wave propagation parameters comprise time of flight of the acoustic wave pulse and amplitude of the acoustic wave pulse.

15. The waveguide assembly of claim 2, wherein the waveguide is formed of solid or hollow structures that are capable of propagating the ultrasonic acoustic wave signal through the structural portions of the waveguide assembly.

16. A self-powered acoustic sensor system for sensing an environmental attribute when a sensor installed inside an enclosure is isolated by a medium of the enclosure, comprising:
- a bulk acoustic wave (BAW) transducer configured to be installed on an outer surface of the enclosure;
- a solid acoustic horn isolated from the bulk acoustic wave transducer by the enclosure, configured to be installed on an inner surface of the enclosure at a first interface, and configured to receive an ultrasonic wave pulse generated by the BAW transducer;
- a first waveguide portion connected at a first end to the acoustic horn at a second interface;
- a second waveguide portion connected to the first waveguide portion at a third interface configured at a distal end of the waveguide assembly,
- wherein the self-powered acoustic sensor system is configured such that the ultrasonic wave pulse from the bulk acoustic wave transducer can be reflected by the second interface, the third interface, and the distal end and propagate back to the acoustic horn where the ultrasonic wave pulse is focused through the first interface and propagates through the inner enclosure surface and the outer enclosure surface back to the bulk wave transducer; and
- wherein the environmental attributes to be measured include temperature, pressure, relative humidity, and gas species.

* * * * *

UNITED STATES PATENT AND TRADEMARK OFFICE
CERTIFICATE OF CORRECTION

| | | |
|---|---|---|
| PATENT NO. | : 11,237,135 B2 | Page 1 of 1 |
| APPLICATION NO. | : 16/528577 | |
| DATED | : February 1, 2022 | |
| INVENTOR(S) | : Dan Xiang and Uday Singh | |

It is certified that error appears in the above-identified patent and that said Letters Patent is hereby corrected as shown below:

In the Specification

Please add the following government rights clause:
This Invention was made with U.S. Government support under Contract No. DE-SC0013745 awarded by the Department of Energy. The Government has certain rights in this invention.

Signed and Sealed this
Twenty-fourth Day of September, 2024

Katherine Kelly Vidal
*Director of the United States Patent and Trademark Office*